United States Patent

Warren et al.

[11] Patent Number: 6,153,850
[45] Date of Patent: Nov. 28, 2000

[54] METHOD OF CUTTING A WORKPIECE ALONG AN ARCUATE PATH WITH A PLASMA ARC TORCH

[75] Inventors: Joseph Valerious Warren, Florence; Barry Gaskins Turner, Pamplico, both of S.C.

[73] Assignee: The ESAB Group, Inc., Florence, S.C.

[21] Appl. No.: 09/301,777

[22] Filed: Apr. 29, 1999

[51] Int. Cl.$^7$ .................................................... B23K 9/00
[52] U.S. Cl. .................. 219/121.44; 219/121.39
[58] Field of Search .................. 219/121.44, 121.39, 219/121.72, 121.48, 121.67, 121.54; 266/70; 73/29.01; 700/95; 83/15–16, 360, 370, 591, 170, 171

[56] References Cited

U.S. PATENT DOCUMENTS

| | | |
|---|---|---|
| 3,745,321 | 7/1973 | Shapiro et al. . |
| 3,891,824 | 6/1975 | Essers et al. . |
| 3,949,188 | 4/1976 | Haruo Tateno . |
| 4,092,719 | 5/1978 | Salmon ....................................... 700/95 |
| 4,133,988 | 1/1979 | Esibyan et al. . |
| 4,156,125 | 5/1979 | Brown . |
| 4,180,719 | 12/1979 | Lutz .................................... 219/125.12 |
| 4,273,988 | 6/1981 | Iceland et al. . |
| 4,330,110 | 5/1982 | Creech ....................................... 266/70 |
| 4,740,668 | 4/1988 | Perez .................................. 219/121.39 |
| 4,758,707 | 7/1988 | Ogilvie et al. . |
| 4,778,155 | 10/1988 | Suchevich et al. . |
| 4,818,840 | 4/1989 | Booth et al. ......................... 219/121.72 |
| 4,918,283 | 4/1990 | Yamade et al. . |
| 4,983,807 | 1/1991 | Yamada et al. ..................... 219/121.48 |
| 5,036,176 | 7/1991 | Yamaguchi et al. . |
| 5,043,554 | 8/1991 | Kohsaka et al. .................... 219/121.39 |
| 5,086,205 | 2/1992 | Thommes . |
| 5,166,494 | 11/1992 | Luo et al. . |
| 5,183,990 | 2/1993 | Enyedy . |
| 5,288,970 | 2/1994 | Nishi . |
| 5,326,955 | 7/1994 | Nishi et al. . |
| 5,380,976 | 1/1995 | Couch, Jr. et al. . |
| 5,406,052 | 4/1995 | Mizuno et al. . |
| 5,414,236 | 5/1995 | Couch, Jr. et al. . |
| 5,424,507 | 6/1995 | Yamaguchi . |
| 5,440,097 | 8/1995 | Kiebl et al. . |
| 5,466,905 | 11/1995 | Flowers et al. . |
| 5,466,909 | 11/1995 | Nihei et al. ........................ 219/121.72 |
| 5,506,384 | 4/1996 | Yamaguchi . |
| 5,521,350 | 5/1996 | Nishi et al. . |
| 5,525,778 | 6/1996 | Matsui et al. . |
| 5,591,357 | 1/1997 | Couch, Jr. et al. . |
| 5,614,110 | 3/1997 | Shintani et al. . |
| 5,620,617 | 4/1997 | Borowy et al. . |
| 5,653,895 | 8/1997 | Shintani . |
| 5,688,418 | 11/1997 | Yoshiyasu et al. .................... 73/29.01 |
| 5,695,663 | 12/1997 | Shintani et al. . |
| 5,726,419 | 3/1998 | Tabata et al. . |

*Primary Examiner*—Teresa Walberg
*Assistant Examiner*—Quang Van
*Attorney, Agent, or Firm*—Alston & Bird LLP

[57] ABSTRACT

A method of cutting a workpiece along a cutting path that is arcuate or that has one or more arcuate portions includes the step of determining a control parameter that is proportional to the angular velocity of the torch. The arc current supplied to the torch is regulated based on the control parameter and the linear advance rate of the torch, which in turn is a function of the material type and thickness of the workpiece. In one embodiment of the invention suitable for the cutting of holes, the control parameter is the diameter of the hole to be cut, which for a specified linear advance rate is inversely proportional to the angular velocity of the torch. The current is increased above a nominal current when the hole diameter is less than or equal to a predetermined limiting diameter, and otherwise is set at the nominal current. In other embodiments of the invention suitable for cutting holes or other shapes, the control parameter is the radius of curvature of the cutting path. Alternatively, the angular velocity can be used as the control parameter. Increasing the current at higher angular velocities and/or when cutting holes of small diameter tends to reduce the problem of the arc not following the desired cutting path and creating cut surfaces that do not conform to the desired cut surfaces.

12 Claims, 3 Drawing Sheets

METHOD OF CUTTING A WORKPIECE ALONG AN ARCUATE PATH WITH A PLASMA ARC TORCH

FIELD OF THE INVENTION

The invention relates to methods for cutting holes and other arcuate shapes in metal using a plasma arc torch.

BACKGROUND OF THE INVENTION

Plasma arc torches are commonly used for the working of metals, including cutting, welding, surface treating, melting, and annealing. Such torches include an electrode which supports an electric arc that extends from the electrode to a workpiece. A plasma gas such as an oxidizing gas is typically directed to impinge on the workpiece with the gas surrounding the arc in a swirling fashion. In some types of torches, a second shielding gas is used to surround the jet of plasma gas and the arc for controlling the work operation. In other types of torches, a swirling jet of water is used to surround the jet of plasma gas and the arc and impinge on the workpiece for controlling the work operation.

In a variety of circumstances, it is desired to cut metal workpieces along cutting paths that are at least partly arcuate in shape such that the torch has a nonzero angular velocity during at least portions of the cutting operation. The advance rate of the torch in surface feet per minute is generally a function primarily of the type and thickness of the material being cut and the current density of the torch expressed in amps of arc current per square inch of nozzle area. Thus, in existing plasma arc cutting methods, the advance rate of the torch typically is selected independently of the shape or contour of the cutting path along which the torch is moved. Accordingly, when the torch is moving along an arcuate path, the angular rate of movement of the torch increases in an inversely proportional manner to the radius of curvature of the cutting path.

A phenomenon which has been noted in cutting small holes (e.g., hole diameters of about 1 inch or less) with a plasma arc torch is that the increased angular rate of the torch results in the arc not following the desired noncircular or circular path, but rather "whipping" around. Although not wishing to be bound by theory, it is thought that centrifugal effects become more and more significant as the angular velocity of the torch increases, such that the centrifugal effects are great enough to influence the movement of the arc, perhaps because the plasma gas flow does not follow the torch as accurately as it does at lower angular velocities. The result of this arc whipping is that the workpiece is cut along a path that does not conform to the desired cutting path. Problems of nonconformance are especially likely at the end of a hole cut where the finishing end of the cutting path joins the starting end of the cutting path. However, nonconformance caused by arc whipping can result whenever the torch is moved along a nonlinear path during a cutting operation.

SUMMARY OF THE INVENTION

The above needs are met and other advantages are achieved by the present invention, which provides improved methods for cutting with a plasma arc torch. In accordance with preferred embodiments of the invention, the current supplied to the torch is regulated as a function not only of the linear advance rate but also as a function of the angular rate of movement of the torch. It has been found that, for reasons that are not understood, increasing the current supplied to the torch tends to make the arc less susceptible to whipping around when the torch is moved along an arcuate path. Accordingly, in preferred embodiments of the invention, the current is increased when the angular rate of the torch increases.

In accordance with one preferred embodiment of the invention, the method comprises the steps of directing a plasma gas through a nozzle of a plasma arc torch and toward the workpiece, supplying current to the electrode to establish an electric arc from the electrode to the workpiece such that the arc cuts through the workpiece, moving the torch along a predetermined arcuate cutting path at a predetermined linear advance rate such that the torch has a determinable angular rate of movement, and regulating the current supplied to the electrode as a function of both the linear advance rate and a control parameter that is proportional to the angular rate of movement of the torch.

The invention provides improved methods for cutting circular holes in a workpiece, wherein the torch is moved along a circular cutting path having a predetermined diameter, and wherein the current is regulated as a function of the linear advance rate and the diameter of the cutting path which is inversely proportional to the angular rate of movement of the torch. Preferably, the current is regulated to a predetermined first value when the diameter of the cutting path is greater than a predetermined limit, and is increased to a predetermined second value when the diameter of the cutting path is equal to or less than the predetermined limit.

The method in one embodiment comprises increasing the arc density, expressed in amps per square inch of nozzle area, from a nominal arc density when the diameter of the cutting path is greater than the predetermined limit, to an arc density about 15 to 50 percent above its nominal level when the diameter is equal to or less than the predetermined limit. For example, the arc density advantageously can be about 75,000 amps per square inch for cutting holes greater than about 1 inch in diameter, and can be increased to an average of about 90,000 amps per square inch for cutting holes of about 1 inch or less in diameter. This is merely an illustrative example, and it will be appreciated that the arc density can vary depending on the material type and thickness of the workpiece as well as other factors.

In accordance with a preferred embodiment of the invention, the increased arc density is accomplished by pulsing the current, i.e., periodically increasing the current to a higher level for a short period of time and then reducing the current back to a lower level, such that the average current over time is greater than nominal by 15 to 50 percent. It is thought that pulsing the current may be less degrading to the electrode and other consumable components of the torch than a constant current at the higher level would be.

In accordance with yet another preferred embodiment of the invention, a method for cutting a workpiece of known material and thickness along a cutting path that includes one or more arcuate portions comprises the steps of moving the torch along the cutting path, determining a linear advance rate of the torch at a point along an arcuate portion of the cutting path, determining a control parameter that is a function of an angular rate of movement of the torch at said point, and regulating the current supplied to the electrode at said point as a function of the material and thickness of the workpiece, the linear advance rate, and the control parameter. If desired, the radius of curvature of the cutting path can be selected as the control parameter, and the current can be increased whenever the radius of curvature is less than a predetermined value. Such predetermined value can itself be a function of the linear advance rate.

The method of the invention is well-suited for, but not limited to, cutting operations performed by a numerically controlled plasma arc torch system. Accordingly, a preferred embodiment of the invention provides a method including the steps of moving the torch along a predetermined cutting path by operating first and second linear motion actuators that are operable respectively to move the torch in X- and Y-directions and to provide output signals indicative of X- and Y-coordinates of the torch, determining derivatives of the X- and Y-coordinates from the output signals of the actuators, and determining the control parameter based on said derivatives. The linear advance rate can also be determined from the derivatives. Advantageously, the control parameter can be selected to be the radius of curvature of the cutting path, which can be determined, for example, from a second derivative of the Y-coordinate with respect to the X-coordinate. Alternatively, the control parameter can be the angular velocity of the torch, which can be determined from first derivatives of the X- and Y-coordinates with respect to time and the radius of curvature of the cutting path.

Thus, the invention provides methods of plasma arc cutting of workpieces along arcuate cutting paths wherein the cutting process is controlled through regulation of the current so as to minimize the phenomenon of arc whipping and thereby achieve improved conformance of the resulting cut surfaces to the desired cutting path.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
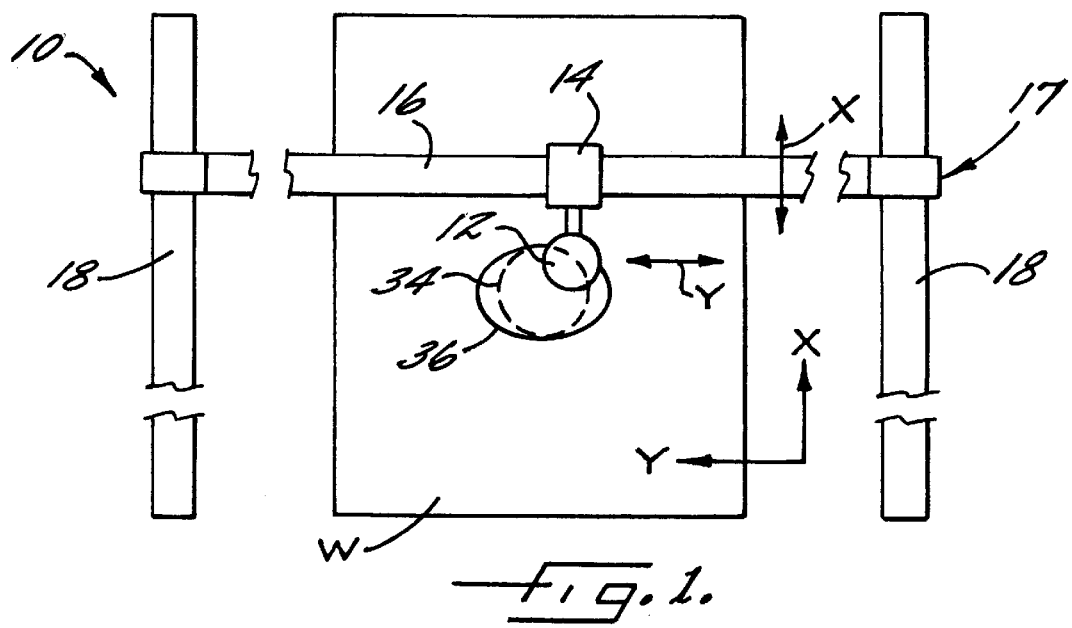
FIG. 1 is a schematic top elevation of a plasma arc torch apparatus illustrating a path of movement of the plasma arc torch representing a desired cutting path for forming a circular hole in a workpiece, and also showing an example of a nonconforming hole that is formed when there is substantial arc whipping.

The invention is best explained by first describing features of conventional automated plasma arc torch systems that are commonly used for the plasma arc cutting of metals in an automated fashion with the aid of numerically controlled machines that move the plasma arc torch along a desired cutting path. With reference to FIG. 1, a conventional automated plasma arc torch machine 10 is schematically illustrated. The torch machine 10 includes a plasma arc torch 12 mounted on a linearly movable saddle 14. The saddle 14 is linearly movable along one or more rails or tracks 16 that extend along a Y-axis and form a part of a movable gantry 17. The gantry 17 is linearly movable along one or more rails or tracks 18 that extend along an X-axis and are part of a structural support or base of the machine. Thus, the torch 12 can be moved in X- and Y-directions by movement of the gantry 17 and saddle 14.

Figure 2:
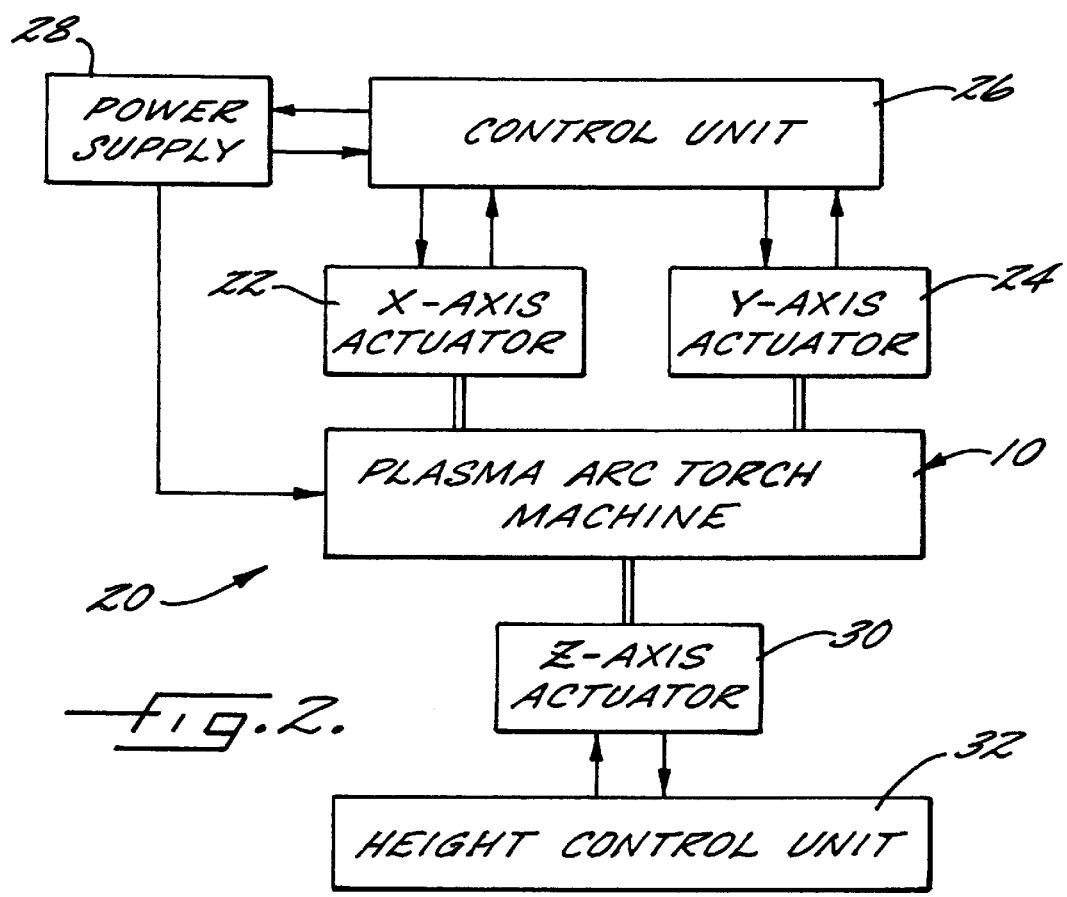
FIG. 2 is a block diagram depicting the components of a plasma arc torch system.

With reference to FIG. 2, a plasma arc torch system 20 is diagrammatically illustrated. The torch system 20 includes the plasma arc torch machine 10, an X-axis actuator 22 that is operable to move the gantry 17 in the X-axis direction, and a Y-axis actuator 24 that is operable to move the saddle 14 in the Y-axis direction. The torch system further includes a control unit 26 for controlling the operation of the actuators 22 and 24. The control unit 26 typically is programmable so that X- and Y-coordinates of a desired cutting path can be programmed into the controller, the controller than operating the actuators 22 and 24 so as to move the torch 12 along the desired path. The torch system 20 also includes a power supply 28 that is connected to the torch 12 and is operable to supply current to the electrode (not shown) of the torch 12 so that an electric arc is maintained between the electrode and a workpiece W (FIG. 1) being cut. The control unit 26 advantageously is operable to control the current supplied by the power supply 28 to the torch 12.

The torch system 20 further includes a Z-axis actuator 30 operable to move the torch 12 along a Z-axis (not shown) that is orthogonal to both the X- and Y-axes so as to move the torch closer to or farther away from the surface of the workpiece W. The distance or height of the torch from the workpiece is commonly referred to as the standoff height of the torch. The system 20 includes a height control unit 32 operable to control the Z-axis actuator 30 so as to control the standoff height of the torch.

As shown in FIG. 1, the torch 12 can be moved along a desired cutting path, such as the circular path 34 indicated by the dashed circle. In conventional plasma arc cutting processes, the speed at which the torch moves along the path, referred to herein as the linear advance rate, is primarily a function of the material and the thickness of the workpiece W. Accordingly, for a given material and thickness, the angular velocity of the torch increases in inverse proportion to the radius of curvature of the cutting path. For instance, for cutting ¼-inch thick aluminum, a typical advance rate is about 100 inches per minute. If a hole of 3-inch diameter is to be cut, the angular velocity of the torch will be about 64° per second. However, if a 1-inch diameter hole is to be cut, the angular velocity will be three times that amount, or about 190° per second.

A phenomenon which has been noted in cutting small holes (e.g., hole diameters of about 1 inch or less) with a plasma arc torch is that the arc does not follow the desired cutting path, but rather "whips" around. Although not wishing to be bound by theory, it is thought that centrifugal effects become more and more significant as the angular velocity of the torch increases, such that the centrifugal effects are great enough to influence the movement of the arc, perhaps because the plasma gas flow does not follow the torch as accurately as it does at lower angular velocities. The result of this arc whipping is that the workpiece is cut along a path that does not conform to the desired cutting path. This is illustrated by the noncircular hole 36 shown in solid line in FIG. 1. The problem of arc whipping tends to become worse as the diameter of the hole decreases, and it is thought that the angular velocity of the torch plays a major role in the phenomenon.

A solution to this problem would at first appear to be provided by simply reducing the linear advance rate of the torch. However, reducing the torch speed also leads to degradation in the smoothness of the cut surfaces. Moreover, faster cutting speeds are desirable because they directly impact productivity. Thus, slowing the advance rate of the torch is not a viable solution to the problem.

The inventors of the present invention have discovered that the arc whipping phenomenon is significantly reduced when the current supplied to the torch is increased. It is thought that a higher current leads to a "stiffer" arc that is less affected by centrifugal effects. However, the precise mechanisms that are responsible for the improvement in performance are not well understood.

Figure 3:
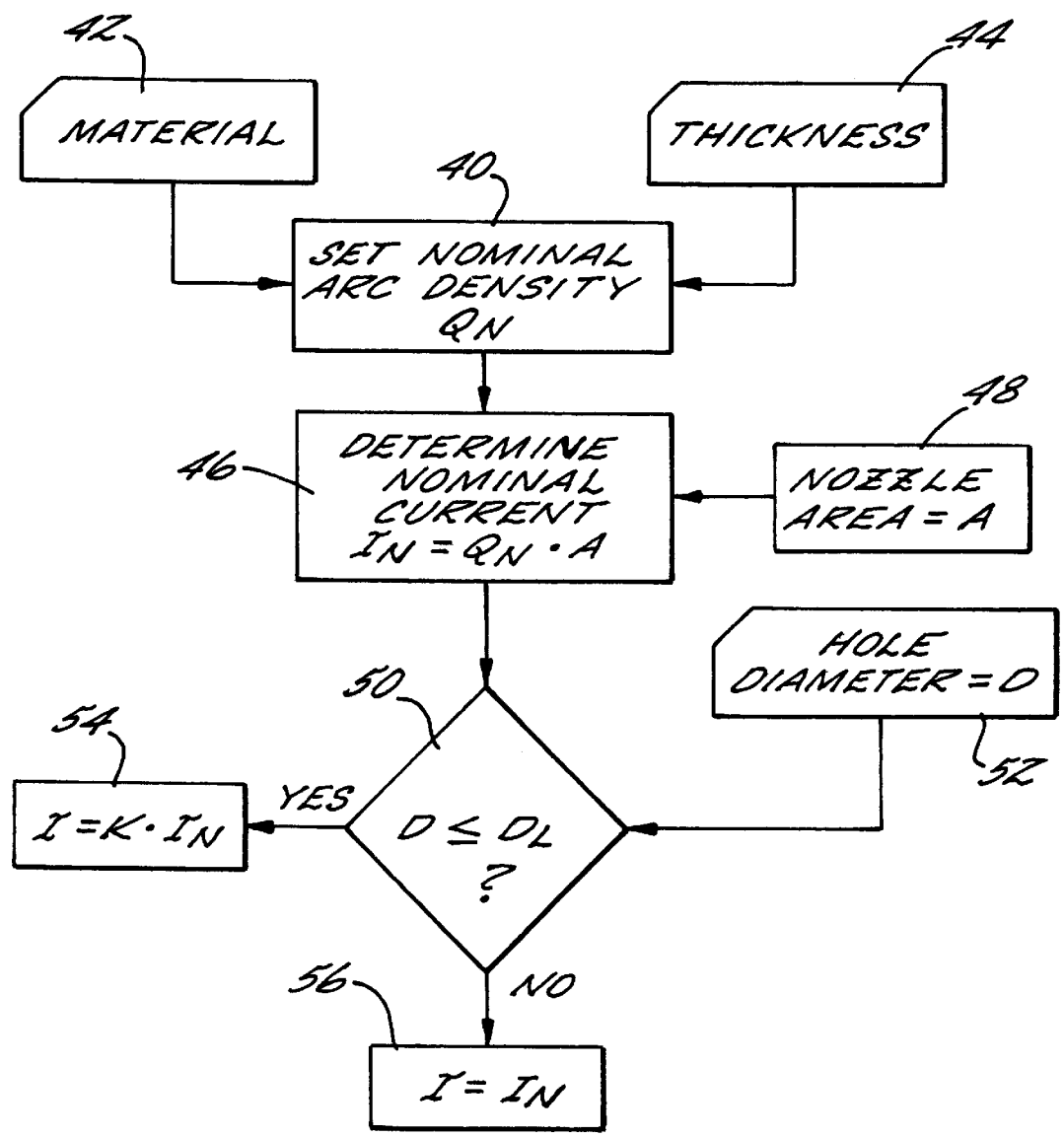
FIG. 3 is a process diagram illustrating a method for controlling a plasma arc torch in accordance with one preferred embodiment of the invention wherein a circle routine is used for controlling the current supplied to the torch.

Accordingly, the present invention provides methods for cutting with a plasma arc torch wherein the current supplied to the torch is controlled based not only on the material type and thickness parameters of the workpiece, but also on a control parameter that is proportional to the angular velocity of the torch. Various control parameters can be used. One preferred embodiment of the invention is depicted in FIG. 3, which depicts a process diagram for a plasma arc cutting process adapted particularly for cutting circular holes in workpieces. As shown at process block 40, a nominal arc density $Q_N$ is set based on information on material of the workpiece shown at input block 42 and the thickness of the workpiece shown at input block 44. The arc density Q is defined as the arc current I divided by the nozzle area A at the exit of the plasma gas nozzle. At process block 46, a nominal arc current $I_N$ is determined based on the nominal arc density $Q_N$ and the known nozzle area A shown at input block 48. The nominal arc current $I_N$ is the arc current that would ordinarily be used for cutting a workpiece of the given material and thickness without taking into account the problem of arc whipping, for example where a linear cut is to be made. Next, at decision block 50, the diameter D of the hole to be cut, shown at input block 52, is compared to a predetermined limiting diameter $D_L$. If the hole diameter D is less than or equal to the limiting diameter $D_L$, then the arc current I to be supplied to the torch is scaled up from the nominal current $I_N$ by a scaling factor K that advantageously ranges from about 1.15 to about 1.5 (i.e., the current is increased by about 15 to 50 percent) as shown at process block 54. If the hole diameter D is greater than the limiting diameter $D_L$, then the current is set at the nominal current $I_N$ as shown at process block 56.

The limiting diameter $D_L$ can be different for different types and thicknesses of material, if desired. Similarly, the current scaling factor K can also be a function of the material type and thickness. In some cases it may be advantageous to use different scaling factors K for different torch nozzle diameters. Other factors may also affect the optimum ranges for limiting diameter and scaling factor.

As an illustrative example, a test was performed using a plasma arc torch having a nozzle diameter of 0.038 inch operating at a standoff height of 0.25 inch and a linear advance rate of 65 inches per minute. A 1-inch diameter hole was cut in a 0.25-inch thick plate of aluminum alloy using an arc current of 70 amps, which yielded an arc density of about 62,000 amps per square inch. A second test was performed on an identical aluminum alloy plate using the same torch, standoff height, and advance rate, but the 1-inch diameter hole was cut at an average arc current of 100 amps, which yielded an arc density of about 88,000 amps per square inch. A substantial improvement was noted for the hole cut at the higher arc density, in terms of the roundness of the hole both at the upper and lower surfaces of the workpiece and the squareness of the hole with respect to the surfaces of the workpiece.

Of course, the invention is not limited to processes for cutting circular holes. In some applications, it may be desirable to control current on a real-time basis so that at every point along a cutting path the current is regulated based on a control parameter that is proportional to the angular velocity of the torch. Such current control can be implemented, for example, by programming a suitable control scheme into a programmable controller of a CNC plasma arc torch system such as the system 20 depicted in FIGS. 1 and 2. In such CNC systems, the X- and Y-axis actuators 22 and 24 typically provide output signals indicative of the X- and Y-positions of the torch, and these signals are communicated to the control unit 26 for purposes of feedback control of the actuators. These signals can also be used by the control unit 26, if suitably programmed, in order to determine various parameters including the slope of the cutting path dY/dX, and the second derivative $d^2Y/dX^2$ of the cutting path. Alternatively, instead of the controller determining the derivative parameters on a real-time basis, they can be preprogrammed into the controller along with the X- and Y-coordinates of the cutting path so that, for example, the controller can look up the second derivative corresponding to the particular X- and Y-coordinates of a given point along the cutting path. The second derivative is inversely proportional to the radius of curvature of the cutting path, which can advantageously be used as a control parameter for controlling current. Thus, the radius of curvature can be determined for each point along the cutting path and the current can be regulated based on the radius of curvature.

Figure 4:
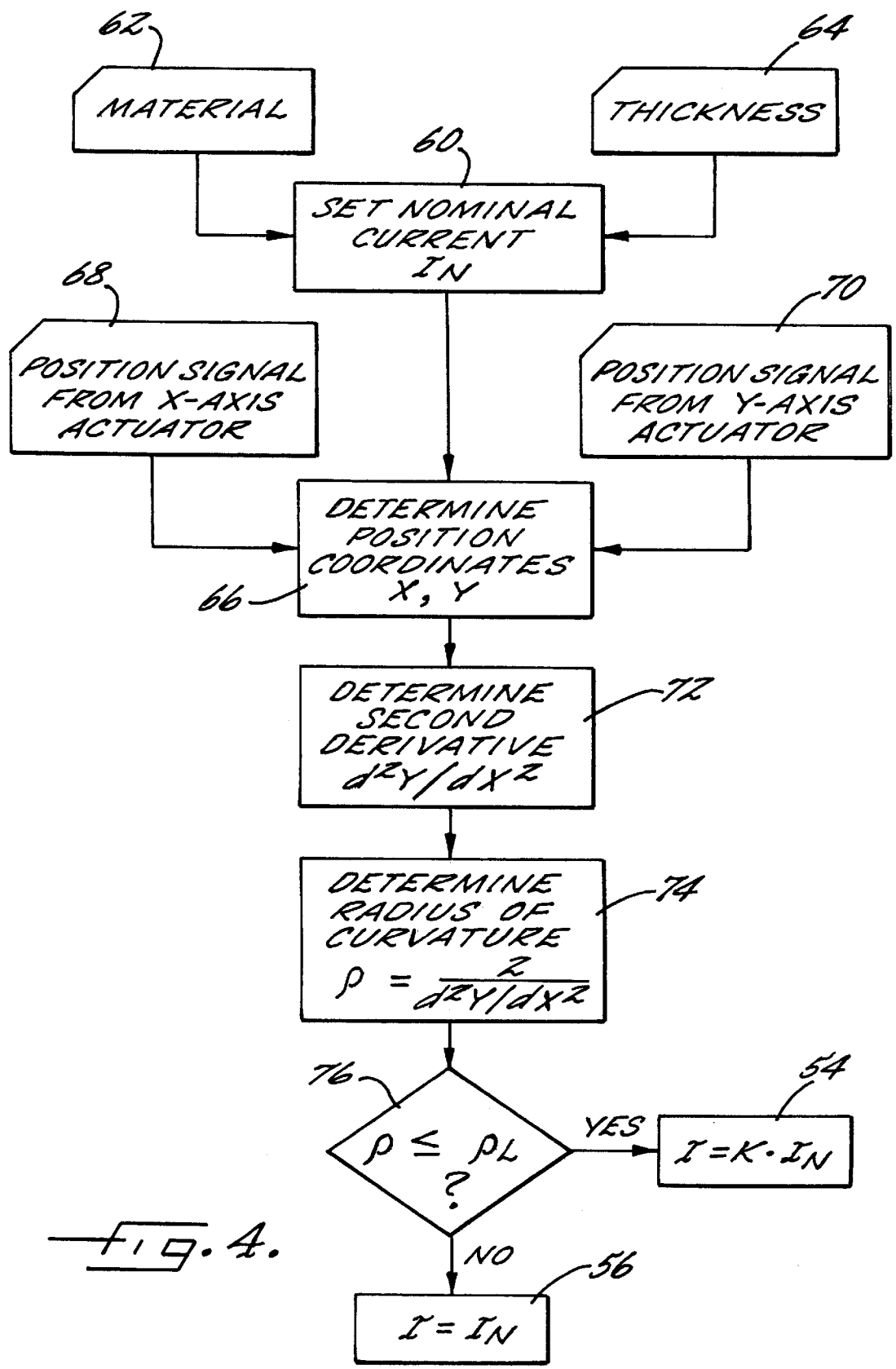
FIG. 4 is a process diagram illustrating another preferred embodiment of the invention wherein a routine is used for determining angular velocity of the torch based on position feedback signals received from X- and Y-axis actuators of a plasma arc torch system, and the determined angular velocity is used as a control parameter for controlling the current supplied to the torch.

FIG. 4 shows an illustrative process in which radius of curvature is used for controlling the arc current. At process block 60, a nominal current $I_N$ is set based on information on the material of the workpiece shown at input block 62 and the thickness of the workpiece shown at input block 64. At process block 66, the position coordinates X,Y are determined for a point along the cutting path based on the position signal from the X-axis actuator shown at input block 68 and the position signal from the Y-axis actuator shown at input block 70. At process block 72, the second derivative $d^2Y/dX^2$ of the cutting path at the point X,Y is determined using a suitable method such as one of the methods described above. The radius of curvature ρ of the cutting path at the point X,Y is then determined based on the second derivative, as shown at process block 74. At decision block 76, if the radius of curvature $ρ_L$, is less than or equal to a predetermined limiting radius ρL, the arc current I is scaled up from the nominal arc current $I_N$ by a scaling factor K; otherwise, the arc current is set equal to the nominal arc current.

Many modifications and other embodiments of the invention will come to mind to one skilled in the art to which this invention pertains having the benefit of the teachings presented in the foregoing descriptions and the associated drawings. For example, other control parameters can be used instead of the radius of curvature or diameter of a cutting path. In some cases it may be desirable to use the angular velocity of the torch as a control parameter, and to regulate the current based on the angular velocity. For instance, the arc current can be set at a nominal value whenever the angular velocity is less than or equal to a predetermined value, and can be increased whenever the angular velocity exceeds that value. As another example, a control unit can be programmed to increase the current to a predetermined value for certain portions of a cutting path, such as the arcuate end regions of an elongated linear slot having rounded ends. Many other variations on the basic concept of the invention are possible. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of cutting through a workpiece along an arcuate path, comprising:

supplying current to a plasma arc torch to establish an electric arc from the torch to the workpiece such that the arc cuts through the workpiece;

moving the torch along a circular cutting path having a predetermined diameter at a predetermined linear advance rate such that the torch has a determinable angular rate of movement; and regulating the current supplied to the torch as a function of both the linear advance rate and the diameter of the cutting path which is inversely proportional to the angular rate of movement of the torch, such that a magnitude of the current is increased when the diameter of the cutting path decreases.

2. The method of claim 1, wherein the regulating step comprises regulating the current to a predetermined first value when the diameter of the cutting path is greater than a predetermined limit, and increasing the current to a predetermined second value when the diameter of the cutting path is equal to or less than the predetermined limit.

3. The method of claim 2, wherein the regulating step comprises increasing the current to the second value which is about 15 to 50 percent greater than the first value when the diameter of the cutting path is equal to or less than the predetermined limit.

4. The method of claim 3, wherein the regulating step comprises pulsing the current when the mean diameter of the cutting path is equal to or less than the predetermined limit such that the average current is about 15 to 50 percent greater than the first value.

5. A method of cutting through a workpiece along a cutting path at least a portion of which is arcuate, comprising:

supplying current to a plasma arc torch to establish an electric arc from the torch to the workpiece such that the arc cuts through the workpiece;

moving the torch along the cutting path at a predetermined linear advance rate;

determining a radius of curvature of the cutting path at a point along an arcuate portion of the cutting path; and regulating the current supplied to the torch at said point as a function of both the linear advance rate and the radius of curvature, such that the current is increased when the radius of curvature of the cutting path is equal to or less than a predetermined value.

6. The method of claim 5, wherein the regulating step further comprises regulating the current so as to achieve a predetermined arc density as a function of the linear advance rate and the diameter of the cutting path.

7. The method of claim 5, wherein the step of moving the torch comprises moving the torch along a predetermined cutting path described by predetermined coordinates, and wherein the step of determining the radius of curvature comprises determining the radius of curvature based on the predetermined coordinates.

8. The method of claim 5, further comprising the step of decreasing the linear advance rate of the torch when the determined angular rate exceeds a predetermined value.

9. A method of cutting through a workpiece along a cutting path at least a portion of which is arcuate, the workpiece being formed of a predetermined material and having a predetermined thickness, the method comprising:

supplying current to a plasma arc torch to establish an electric arc from the torch to the workpiece such that the arc cuts through the workpiece;

moving the torch along the cutting path;

determining a linear advance rate of the torch at a point along an arcuate portion of the cutting path;

determining a radius of curvature of the cutting path at said point; and regulating the current supplied to the torch at said point as a function of the material and thickness of the workpiece, the linear advance rate, and the radius of curvature of the cutting path, such that a magnitude of the current is increased when the radius of curvature is equal to or less than a predetermined value.

10. The method of claim 9, wherein the regulating step further comprises regulating the current so as to achieve a predetermined arc density as a function of the material and thickness of the workpiece, the linear advance rate, and the radius of curvature.

11. The method of claim 9, wherein the step of moving the torch comprises moving the torch along a predetermined cutting path described by predetermined coordinates, and wherein the step of determining the radius of curvature comprises determining the radius of curvature based on the predetermined coordinates.

12. The method of claim 9, wherein the step of moving the torch comprises moving the torch along a predetermined cutting path by operating first and second linear motion actuators that are operable respectively to move the torch in X- and Y-directions and to provide output signals indicative of X- and Y-coordinates of the torch, and wherein the step of determining the radius of curvature comprises determining derivatives of the X- and Y-coordinates from the output signals of the actuators and determining the radius of curvature based on said derivatives.

* * * * *